United States Patent [19]
Laymance

[11] 3,986,398
[45] Oct. 19, 1976

[54] LIQUID LEVEL INDICATOR

[76] Inventor: Louie A. Laymance, 36254 Golden State Highway, Lebec, Calif. 93243

[22] Filed: Sept. 4, 1975

[21] Appl. No.: 610,260

[52] U.S. Cl. ............................................. 73/299
[51] Int. Cl.[2] ..................................... G01F 23/16
[58] Field of Search .................................. 73/299

[56] References Cited
UNITED STATES PATENTS

| 3,094,874 | 6/1963 | Rolle | 73/299 |
| 3,693,738 | 9/1972 | Andrews | 73/299 X |
| 3,745,001 | 7/1973 | Lawford et al. | 73/299 |

FOREIGN PATENTS OR APPLICATIONS

| 1,135,614 | 4/1961 | France | 73/299 |
| 1,518,419 | 2/1968 | France | 73/299 |

*Primary Examiner*—Jerry W. Myracle
*Assistant Examiner*—Joseph W. Roskos
*Attorney, Agent, or Firm*—Max E. Shirk

[57] ABSTRACT

Fuel compresses air in a bell mounted in fuel tank; compressed air is conducted to a gauge on instrument panel in a vehicle. The gauge includes an adjusting screw which is in an exposed position on the instrument panel so that a driver may readily calibrate the gauge to reflect the amount of fuel in the tank regardless of the size of the tank.

4 Claims, 4 Drawing Figures

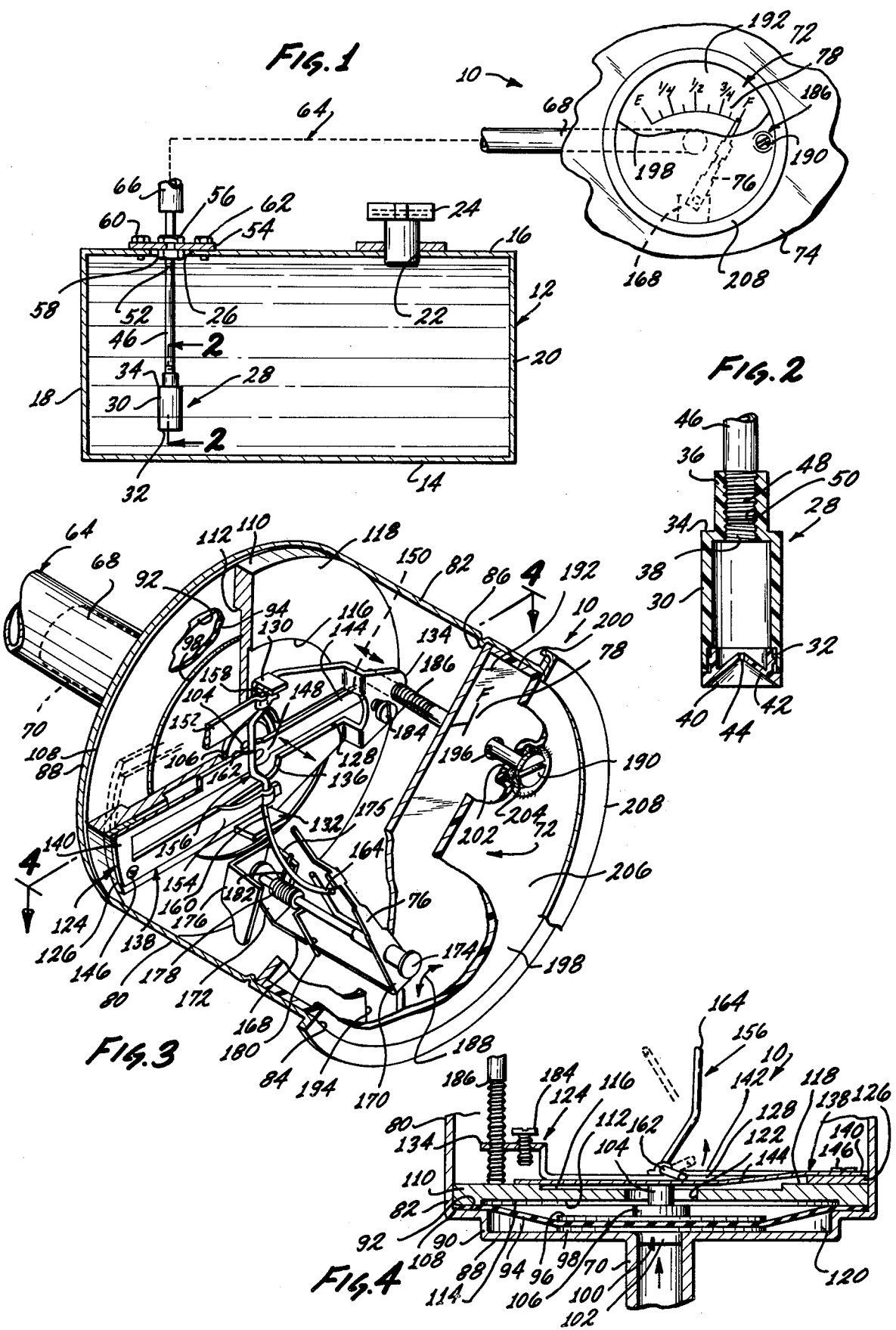

LIQUID LEVEL INDICATOR

BACKGROUND OF THE INVENTION

The background of the invention will be set forth in two parts.

FIELD OF THE INVENTION

The present invention pertains generally to the field of liquid level indicators and more particularly to a new and useful adjustable gauge for an indicator of the type which conducts compressed air from a fuel tank to a gauge on an instrument panel.

DESCRIPTION OF THE PRIOR ART

Large trucks are conventionally equipped with electric fuel gauges. These gauges have the disadvantages that road vibrations soon make them malfunction and the fact that they are designed for a tank of a particular size makes them unsuitable when a trucker installs auxilliary tanks.

Applicant is familiar with one liquid level indicator which was designed to overcome the vibration problem. This device included a bell which was mounted in the fuel tank so that fuel contained in the tank would compress air in the bell in proportion to the amount of fuel in the tank. Compressed air was conducted to a gauge on the instrument panel. While generally satisfactory, this liquid level indicator has the disadvantage that the gauge must be calibrated at the factory for each size tank in which it will be used.

Other prior art known to applicant is listed by way of illustration, but not of limitation, in separate communications to the United States Patent Office.

SUMMARY OF THE INVENTION

In view of the foregoing factors and conditions characteristic of liquid level indicators, it is a primary object of the present invention to provide a new and useful liquid level indicator not subject to the disadvantages enumerated above and including a gauge which may be readily calibrated to reflect the amount of fuel in a particular tank regardless of the size of the tank.

Another object of the present invention is to provide a new and useful liquid level indicator which exemplifies improvements over the prior art.

According to the present invention, air is compressed in a bell in a fuel tank in accordance with the volume of fuel in the tank. A pressure-responsive gauge is mounted on the instrument panel where it is visible to a driver of a vehicle using the gauge and a conduit connects the air-compressing bell to the gauge.

The gauge includes a diaphragm which is deflected in proportion to the air pressure conducted to it from the bell. The diaphragm moves a leaf spring which, in turn, rotates a crank having a finger which moves a pointer over a dial. The gauge may be calibrated by adjusting the tension on the leaf spring. It is an important feature of the present invention that this adjustment is accomplished with a screw having a head positioned on the outside of the gauge where the head is readily accessible to a user of the gauge.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which like reference characters refer to like elements in the several views.

BRIEF DESCRIPTION OF THE DRAWINGS

FIG. 1 is a cross-sectional view of a fuel tank showing, in elevation, a liquid level indicator of the present invention;

FIG. 2 is an enlarged, partial cross-sectional view taken along line 2—2 of FIG. 1;

FIG. 3 is an enlarge, perspective view, with parts broken away to show internal constuction, of the gauge portion of the liquid level indicator shown in FIG. 1; and FIG. 4 is a partial cross-sectional view taken along line 4—4 of FIG. 3.

DESCRIPTION OF THE PREFERRED EMBODIMENT

Referring again to the drawing, a liquid level indicator constituting a presently preferred embodiment of the invention, generally designated 10, is shown in combination with a fuel tank 12 having a bottom wall 14, a top wall 16 and end walls 18, 20. Top wall 16 is provided with a first opening 22 through which fuel may be introduced into tank 12. Opening 22 may be closed with a vented cap or plug 24. Top wall 16 is provided with a second opening 26 which conventionally accommodates an electric liquid level indicator (not shown).

Liquid level indicator 10 includes an air-trapping device or bell 28 having an encompassing side wall 30 and an internally-threaded, open bottom 32 and a closed top wall 34. Bell 28 may be molded from a suitable plastic material and is provided with an internally-threaded fluid outlet 36 in fluid communication with bell 28 through an opening 38 provided in top wall 34. Open bottom 32 may be closed with an externally-threaded plug 40 having a frustoconical bottom wall 42 provided with a small aperture 44. Plug 40 prevents fuel in tank 12 from surging in bell 28 and minimizes the likelihood that surging fuel will give a false reading on liquid level indicator 10.

Bell 28 is maintained in position in tank 12 near bottom wall 14 by a riser pipe 46 having a first externally-threaded end 48 threadedly engaging internal threads 50 on bell 28 in fluid communication with bell 28 through opening 38. Pipe 46 includes a second externally-threaded end 52 affixed to a plate 54 by a pair of nuts 56, 58. Plate 54 is shaped and sized such that it will fit conventional opening 26 and may be secured to tank 12 by suitable bolts, like the ones shown at 60, 62.

Tank 12 may be filled with a suitable fuel, such as liquid Diesel fuel, through opening 22 by removing plug 24. Fuel entering bell 28 through aperture 44 compresses the air trapped in bell 28 and pipe 46. The amount of compression depends on the volume of fuel in tank 12.

Liquid level indicator 10 includes a suitable flexible conduit 64 having a first end 66 connected to end 52 of pipe 46 and a second end 68 connected to an inlet nipple 70 provided on a pressure-responsive gauge 72 mounted on an instrument panel 74 where gauge 72 is readily accessible to a user of liquid level indicator 10. Conduit 64 conducts compressed air from bell 28 and pipe 46 to gauge 72 for deflecting a needle or pointer 76 over a scale 78 indicating the amount of fuel in tank 12. Scale 78 may be provided with suitable indicia, such as E, ¼, ½, ¾ and F.

Referring more in particular to FIGS. 3 and 4, gauge 72 includes a housing 80 having an encompassing sidewall 82, an open top 84, an inwardly-extending annular shoulder 86 adjacent open top 84, a closed bottom wall 88, an inwardly, downwardly extending flange 90 connecting bottom wall 88 to sidewall 82 for forming an annular ledge 92 above bottom wall 88.

Gauge 72 also includes a thin, rubber diaphragm 94 to which metal discs 96, 98 are secured by a fastener 100 having a head 102 disposed in fluid inlet 70, an upstanding shank 104 and a washer 106. The peripheral edge 108 of diaphragm 94 is trapped on ledge 92 by an annular plate 110 having a first annular recess 112 provided on its lower surface 114 and a second annular recess 116 provided on its upper surface 118. Recess 112 and bottom wall 88 provide a chamber 120 in which diaphragm 94 is free to flex. Plate 110 is provided with an aperture 122 through which shank 104 extends.

Gauge 72 also includes a bracket 124 having a fixed end 126, an elongated opening 128, a pair of upstanding lugs 130, 132 and an elevated free end 134. Elongated opening 128 is enlarged to a substantially circular opening 136 in the vacinity of plate aperture 122 and lugs 130, 132 are positioned on opposite sides of opening 136.

Gauge 72 also includes a leaf spring assembly 138 having a fixed end 140, a bifurcated clip 142 and a leaf spring 144. The fixed end 126 of bracket 124 and the fixed end 140 of spring assembly 138 are secured to plate 110 by suitable fasteners, like the screw shown at 146. Leaf spring 144 is positioned within elongated opening 128 in bracket 124 and includes an intermediate portion 148, which is positioned within opening 136, and a free end 150, which extends to a position beneath the elevated free end 134 of bracket 124. Bifurcated clip 142 includes a pair of arms 152, 154 exerting a downward force on a crank assembly 156 having a first end 158 journaled on lug 130, a second end 160 journaled on lug 132 and an intermediate portion 162 riding on leaf spring 144 in opening 136. End 160 carries an upstanding member 164 extending upwardly into operative association with a finger 166 depending from needle 76.

Needle 76 is carried by a C-shaped bracket 168 having arms 170, 172 pivotally mounted on a post 174 upstanding from plate 110 between a pair of stops 175, 176 engageable by arm 172 to limit the amount needle 76 may swing about post 174. A torsion spring 178 encompasses post 174 and has a first arm 180 engaged against bracket 168 for biasing finger 166 into engagement with crank 156 which, in turn, is biased into engagement with leaf spring 144 by a second arm 182 on spring 178.

Gauge 72 also includes a stop screw 184 threadedly engaging free end 134 of bracket 124 above free end 150 of leaf spring 144 for controlling the upper limit of leaf spring 144. An adjustment of calibration screw 186 also threadedly engages free end 134 of bracket 124 and may be screwed into contact with plate 110 for controlling the elevation of free end 134 and, therefore, the tension in spring 144, the throw of crank 156 and the amount needle 76 swings about post 174 in the direction of arrow 188. As best seen in FIGS. 1 and 3, calibration screw 186 includes a slotted head 190 which is located outside gauge 72 adjacent instrument panel 74 so that a user of gauge 72 may readily adjust screw 186 thereby calibrating gauge 72 for a tank 12 of a particular size. This is an important feature of the present invention because it permits a single liquid level indicator 10 to be used in tanks of different sizes without having to take the gauge apart or adjust it at the factory to calibrate it for tanks of different sizes.

Gauge 72 also includes a dial or plate 192 positioned on annular shoulder 86 in housing 80 and includes a slot 194 which accommodates needle 76 and bracket 168 and an aperture 196 through which calibration screw 186 extends.

Gauge 72 also includes a transparent dial cover 198 having a depending skirt 200 extending into engagement with plate 192. Cover 198 is provided with a recessed aperture 202 which receives a felt washer 204 and slotted head 190 so that head 190 will be flush with the outer surface 206 of cover 198. A retainer ring 208 encompasses a flange 210 on sidewall 82 for maintaining dial cover 198 in position in open top 84.

Operation of the device will be readily understood. Bell 28 and pipe 46 may be readily installed in tank 12 by removing the conventional plate (not shown) which covers opening 26 and replacing it with plate 54. Gauge 72 may then be mounted in a suitable opening (not shown) provided on instrument panel 74 and connected to pipe 46 by conduit 64. Bell 28, pipe 46, conduit 64 and chamber 120 (FIG. 4) will then contain air at atmospheric pressure.

Tank 12 may then be filled with liquid fuel which enters bell 28 through aperture 44 (FIG. 2) compressing the air in bell 28, pipe 46, conduit 64 and chamber 120 in accordance with the volume of liquid introduced into tank 12. When tank 12 is full, a user of gauge 72 may adjust calibration screw 186 by rotating slotted head 190 with a screwdriver until pointer 76 is aligned with indicium F to reflect the volume of liquid in tank 12.

While the particular liquid level indicator herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims, which form a part of this disclosure.

Whenever the term "means" is employed in these claims, this term is to be interpreted as defining the corresponding structure illustrated and described in the specification or the equivalent of the same.

What is claimed is:

1. An instrument for measuring the level of fuel in a fuel tank on a vehicle including an instrument panel having an exposed surface readily accessible to a driver of said vehicle, comprising:

means mounted in said fuel tank for supplying compressed air in an amount proportional to the level of fuel in said tank;

means conducting said compressed air to said instrument panel; and a gauge mounted on said instrument panel and connected to said conducting means for indicating the level of fuel in said fuel tank by measuring said compressed air, said gauge including means for adjusting said gauge to reflect the fuel level in tanks of different sizes and means mounting said adjusting means on said gauge in an exposed position adjacent said exposed surface on said instrument panel, whereby said driver may readily and conveniently adjust said gauge.

2. An instrument as stated in claim 1 wherein said gauge comprises:
 a diaphragm in fluid communication with said compressed air for deflection thereby in an amount proportional to the pressure exerted by said compressed air;
 a needle swingably mounted in said gauge;
 means connecting said needle to said diaphragm for swinging said needle in an amount proportional to the amount said diaphragm is deflected; and
 means connecting said adjusting means to said means connecting said needle to said diaphragm.

3. An instrument for measuring the level of fuel in a fuel tank on a vehicle having an instrument panel readily accessible to a driver of said vehicle, comprising:
 1. means mounted in said fuel tank for supplying compressed air in an amount proportional to the level of fuel in said tank;
 2. means conducting said compressed air to said instrument panel; and
 3. a gauge mounted on said instrument panel and connected to said conducting means for indicating the level of fuel in said fuel tank by measuring said compressed air, said gauge including means for adjusting said gauge to reflect the fuel level in tanks of different sizes, said adjusting means being mounted on said gauge in an exposed position where said driver may readily adjust said gauge, said means for supplying compressed air comprising:
  A. a bell having an encompassing sidewall, an open bottom and a closed top, said closed top being provided with a fluid outlet, said open bottom being closed by an apertured plug for minimizing surging of fuel in said bell; and
  B. a pipe having a first end connected to said fluid outlet on said bell and a second end secured to the top of said tank, said pipe being of sufficient length to position said bell near the bottom of said tank.

4. An instrument for measuring the level of fuel in a fuel tank on a vehicle having an instrument panel readily accessible to a driver of said vehicle comprising:
 1. means mounted in said fuel tank for supplying compressed air in an amount proportional to the level of fuel in said tank;
 2. means conducting said compressed air to said instrument panel; and
 3. a gauge mounted on said instrument panel and connected to said conducting means for indicating the level of fuel in said fuel tank by measuring said compressed air, said gauge including means for adjusting said gauge to reflect the fuel level in tanks of different sizes, said adjusting means being mounted on said gauge in an exposed position where said driver may readily adjust said gauge, said gauge comprising:
  A. a housing having an encompassing sidewall, an open top, an inwardly extending annular shoulder adjacent said open top, a closed bottom wall and an inwardly, downwardly extending flange connecting said bottom wall to said sidewall for forming an annular ledge above said bottom wall;
  B. a fluid inlet connected to said bottom wall for admitting said compressed air to said housing;
  C. a diaphragm mounted on said ledge above said bottom wall in fluid communication with said fluid inlet;
  D. a plate mounted on said ledge above said diaphragm, said plate and said bottom wall forming a chamber in which said diaphragm is free to flex, said plate being provided with an aperture overlying said diaphragm;
  E. an elongaged bracket having a first end connected to said plate and a second free end elevated above said plate, said bracket having an elongated opening overlying said plate and said aperture in said plate, said bracket also having a pair of upstanding legs adjacent said plate aperture on opposite sides thereof;
  F. a leaf spring assembly having a first end anchored to said first end of said bracket, said leaf spring assembly including a leaf spring extending from said anchored end of said leaf spring assembly to a position beneath said free end of said bracket and a bifurcated clip having a pair of arms extending from said first end of said leaf spring assembly to a position adjacent said lugs;
  F. a crank journaled on said lugs and held in position thereon by said arms, said crank having an intermediate portion overlying said leaf spring in said elongated opening on said bracket over said aperture in said plate and an upstanding free end;
  H. a post extending upwardly from said plate adjacent said upstanding free end of said crank;
  I. a pointer swingably mounted on said post;
  J. a spring encompassing said post for biasing said pointer into engagement with said upstanding free end of said crank and for biasing said crank into engagement with said leaf spring;
  K. a dial mounted on said annular shoulder below said pointer;
  L. a transparent dial cover closing said open top on said housing; and
  M. a calibration screw extending through said dial cover and said dial, said screw having a threaded end extending into threaded engagement with said free end of said bracket, said threaded end of said screw being bottomed out on said plate beneath said free end of said bracket for adjusting the tension on said leaf spring and the amount said crank and said pointer will swing when said diaphragm forces said leaf spring upwardly so that said gauge may be adjusted to compensate for tanks of different sizes, said screw having a head provided thereon outside said dial cover, whereby a driver of said vehicle may readily and conveniently calibrate said gauge.

* * * * *